United States Patent
Aida et al.

(10) Patent No.: US 12,087,943 B2
(45) Date of Patent: *Sep. 10, 2024

(54) PRECURSOR OF POSITIVE ELECTRODE ACTIVE MATERIAL FOR NONAQUEOUS ELECTROLYTE SECONDARY BATTERIES AND PRODUCTION METHOD THEREOF AND POSITIVE ELECTRODE ACTIVE MATERIAL FOR NONAQUEOUS ELECTROLYTE SECONDARY BATTERIES AND PRODUCTION METHOD THEREOF

(71) Applicant: SUMITOMO METAL MINING CO., LTD., Tokyo (JP)

(72) Inventors: Taira Aida, Niihama (JP); Hiroyuki Toya, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,905

(22) Filed: Jul. 12, 2023

(65) Prior Publication Data
US 2023/0369580 A1 Nov. 16, 2023

Related U.S. Application Data

(60) Division of application No. 16/509,941, filed on Jul. 12, 2019, now Pat. No. 11,742,479, which is a
(Continued)

(30) Foreign Application Priority Data

Mar. 28, 2014 (JP) .................................. 2014-069590

(51) Int. Cl.
*H01M 4/505* (2010.01)
*C01G 53/00* (2006.01)
(Continued)

(52) U.S. Cl.
CPC ............ *H01M 4/505* (2013.01); *C01G 53/50* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 11,742,479 B2 * | 8/2023 | Aida ................. | H01M 10/0525 |
| | | | 429/223 |
| 2003/0170540 A1 | 9/2003 | Ohzuku et al. | |

(Continued)

FOREIGN PATENT DOCUMENTS

| | | |
|---|---|---|
| CN | 101027805 A | 8/2007 |
| JP | 2004-210560 A | 7/2004 |

(Continued)

OTHER PUBLICATIONS

International Search Report dated Jun. 9, 2015, issued in counterpart International Application No. PCT/JP2015/057229 (2 pages).

(Continued)

*Primary Examiner* — Lucas J. O'Donnell
(74) *Attorney, Agent, or Firm* — WHDA, LLP

(57) ABSTRACT

Provided is a precursor of a positive electrode active material containing, in a reduced amount, impurities which do not contribute to a charge/discharge reaction but rather corrode a firing furnace and peripheral equipment and thus having excellent battery characteristics and safety, and production method thereof.
A method for producing a precursor of a positive electrode active material for nonaqueous electrolyte secondary batteries having a hollow structure or porous structure includes obtaining the precursor by washing nickel-manganese composite hydroxide particles having a particular composition ratio and a pore structure in which pores are present within (Continued)

the particles with an aqueous carbonate solution having a carbonate concentration of 0.1 mol/L or more.

7 Claims, 1 Drawing Sheet

Related U.S. Application Data continuation of application No. 15/129,159, filed as application No. PCT/JP2015/057229 on Mar. 12, 2015, now Pat. No. 10,601,036.

(51) Int. Cl.
  *H01M 4/525* (2010.01)
  *H01M 10/0525* (2010.01)
  *H01M 4/02* (2006.01)

(56) References Cited

U.S. PATENT DOCUMENTS

| | | |
|---|---|---|
| 2006/0068289 A1 | 3/2006 | Paulsen et al. |
| 2010/0187471 A1 | 7/2010 | Paulsen et al. |
| 2012/0132860 A1 | 5/2012 | Schulz-Dobrick et al. |
| 2013/0078520 A1 | 3/2013 | Toya et al. |
| 2013/0149608 A1 | 6/2013 | Kim et al. |
| 2013/0168600 A1 | 7/2013 | Niittykoski et al. |
| 2013/0288129 A1 | 10/2013 | Toya et al. |
| 2014/0011091 A1 | 1/2014 | Endo |
| 2015/0056511 A1 | 2/2015 | Takamatsu et al. |
| 2015/0325838 A1 | 11/2015 | Tamaki et al. |
| 2015/0364761 A1 | 12/2015 | Fukui et al. |

FOREIGN PATENT DOCUMENTS

| | | |
|---|---|---|
| JP | 2011198772 A | 10/2011 |
| JP | 2012-254889 A | 12/2012 |
| JP | 2013-120752 A | 6/2013 |
| JP | 2014-49410 A | 3/2014 |
| JP | 2014-67645 A | 4/2014 |
| JP | 5830178 B2 | 12/2015 |
| WO | 2012-169083 A1 | 12/2012 |
| WO | 2012/169274 A1 | 12/2012 |
| WO | 2013/191179 A1 | 12/2013 |
| WO | 2014061579 A1 | 4/2014 |
| WO | 2014061580 A1 | 4/2014 |

OTHER PUBLICATIONS

International Preliminary Report on Patentability (Form PCT/IB/373) issued in counterpart International Application No. PCT/JP2015/057229 dated Oct. 4, 2016, with Form PCT/ISA/237. (7 pages).
Office Action dated Jul. 20, 2018, issued in counterpart Chinese Application No. 201580016512.X, with English translation. (14 pages).
CN 103972492 to Lu and Yao Thompson Reuters Derwent Abstract (Year: 2014).
JP2012-254889 to Hiromasa et al. English Translation (Year: 2012).
JP5830178B to Kobayashi et al. English Translation (Year: 2015).
English translation of JP2011198772 (Year: 2011).
English translation of WO-2014061579-A1 (Year: 2014).
English translation of WO-2014061580-A1 (Year: 2014).

* cited by examiner

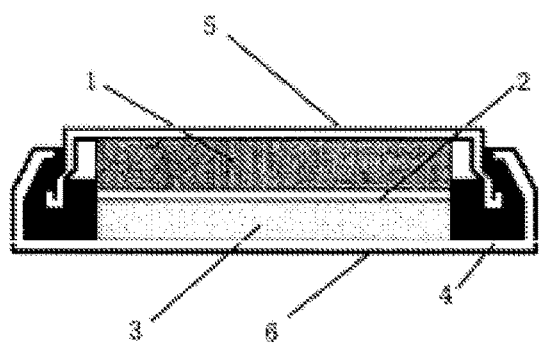

PRECURSOR OF POSITIVE ELECTRODE ACTIVE MATERIAL FOR NONAQUEOUS ELECTROLYTE SECONDARY BATTERIES AND PRODUCTION METHOD THEREOF AND POSITIVE ELECTRODE ACTIVE MATERIAL FOR NONAQUEOUS ELECTROLYTE SECONDARY BATTERIES AND PRODUCTION METHOD THEREOF

CROSS-REFERENCE OF RELATED APPLICATIONS

This application is a divisional application of U.S. patent application Ser. No. 16/509,941 filed Jul. 12, 2019, which is a continuation application of U.S. patent application Ser. No. 15/129,159 filed Sep. 26, 2016, which is a US national stage application of PCT International Application No. PCT/JP2015/057229 filed on Mar. 12, 2015, which is based upon and claims the benefits of priority from Japanese Patent Application No. 2014-069590 filed on Mar. 28, 2014, the entire contents of which are incorporated herein by reference.

TECHNICAL FIELD

The present invention relates to a precursor of a positive electrode active material for nonaqueous electrolyte secondary batteries and production method thereof and a positive electrode active material for nonaqueous electrolyte secondary batteries and production method thereof.

BACKGROUND ART

With the recent wide spread use of portable devices, such as mobile phones and notebook personal computers, there has been a strong demand to develop small, light secondary batteries having high energy density. Among secondary batteries satisfying such a demand are lithium-ion secondary batteries using lithium, lithium alloy, metal oxide, or carbon as a negative electrode active material. Such lithium-ion secondary batteries are being actively researched and developed.

A lithium-ion secondary battery that uses, as a positive electrode active material, lithium composite oxide, particularly, lithium-cobalt composite oxide ($LiCoO_2$), which is relatively easily synthesized, supplies a 4V-level high voltage. For this reason, such lithium-ion secondary batteries are being commercialized as batteries having high energy density. To obtain excellent initial capacity characteristics or cycle characteristics, there have been developed many batteries using lithium-cobalt composite oxide. Various fruits have already been produced.

However, lithium-cobalt composite oxide ($LiCoO_2$) uses a cobalt compound, which is rare and expensive, as a raw material and therefore causes a cost increase. For this reason, there is a demand for a cheaper alternative serving as a positive electrode active material. Reducing the cost of a positive electrode active material and thus producing a cheaper lithium-ion secondary battery is of great industrial significance, since it can contribute to the downsizing and weight-reduction of portable devices which are being currently widely used.

Among new positive electrode active materials for lithium-ion secondary batteries are lithium-manganese composite oxide ($LiMn_2O_4$) using manganese, which is cheaper than cobalt, and lithium-nickel composite oxide ($LiNiO_2$) using nickel.

Lithium-manganese composite oxide is formed of cheap materials and has excellent thermal stability. Accordingly, it can be said to be a promising alternative material to lithium-cobalt composite oxide. However, lithium-manganese composite oxide has difficulty in meeting a demand to increase the capacity of lithium-ion secondary batteries, which has been raised year by year, since its theoretical capacity is only about half that of $LiCoO_2$. As for lithium-nickel composite oxide, it has lower cycle characteristics than lithium-cobalt composite oxide and is more likely to lose battery performance when used or stored in a high-temperature environment.

On the other hand, lithium-nickel-manganese composite oxide has thermal stability and durability similar to those of lithium-cobalt composite oxide and is a promising alternative to lithium-cobalt composite oxide. For example, Patent Literature 1 proposes, as a precursor of a positive electrode active material containing lithium-manganese-nickel composite oxide, manganese-nickel composite hydroxide particles having a manganese-nickel ratio of substantially 1:1, an average particle diameter of 5 to 15 µm, a tap density of 0.6 to 1.4 g/mL, a bulk density of 0.4 to 1.0 g/mL, a specific surface area of 20 to 55 $m^2/g$, and a sulfate group content of 0.25 to 0.45% by mass. Patent Literature 1 also discloses, as a production method of the manganese-nickel composite hydroxide particles, causing a mixed aqueous solution of a manganese salt and a nickel salt having a manganese-nickel atomic ratio of substantially 1:1 to react with an alkali solution in an aqueous solution having a pH of 9 to 13 in the presence of a complexing agent on an appropriate stirring condition while controlling the degree of oxidation of manganese ions to a predetermined range and then coprecipitating the resulting particles.

There has been also proposed a positive electrode active material whose particle structure is controlled so as to improve cycle characteristics or output characteristics. For example, Patent Literature 2 discloses nickel composite hydroxide consisting of approximately spherical secondary particles which are agglomerations of multiple primary particles and which have an average particle diameter of more than 7 µm and equal to or less than 15 µm. The nickel composite hydroxide has [(d90−d10)/average particle diameter] of 0.55 or less, and [(d90−d10)/average particle diameter] is an index indicating the extent of the particle size distribution. Patent Literature 2 also discloses a positive electrode active material for nonaqueous electrolyte secondary batteries obtained using this nickel composite hydroxide. The positive electrode active material has an average particle diameter more than 8 µm and equal to or less than 16 µm, and [(d90−d10)/average particle diameter], which is an index indicating the extent of the particle size distribution, is 0.60 or less. The positive electrode active material includes a shell and a hollow present inside the shell.

CITATION LIST

Patent Literature

[Patent Literature 1] Japanese Unexamined Patent Application Publication No. 2004-210560
[Patent Literature 2] International Publication No. 2012/169274

SUMMARY OF INVENTION

Technical Problem

While the particle structure of the manganese-nickel composite oxide is considered in Patent Literature 1, the reduction of the impurities is not considered. Lithium-nickel-manganese composite oxide obtained using a conventional production method contains impurities that do not contribute to a charge/discharge reaction, such as sulfate groups or chlorine derived from the raw materials. Accordingly, in the production of a battery, an excess negative electrode material in an amount equivalent to the irreversible capacity of the positive electrode material must be used in the battery. This results in reductions in the capacities per weight and per volume of the entire battery. Also, excess lithium accumulated on the negative electrode as the irreversible capacity is problematic in terms of safety.

Further, chlorine remaining as an impurity may volatilize in the firing step, corroding the firing furnace and peripheral equipment. Thus, the product may be contaminated with a foreign metal, causing a short-circuit in the battery. Accordingly, the amount of chlorine must be reduced as much as possible.

As for the positive electrode active material having the hollow structure disclosed in Patent Literature 2, the production process thereof involves neutralizing and crystallizing nickel composite hydroxide, and the neutralization and crystallization include a nuclei formation step of forming the nuclei of particles and a particle growth step of growing the formed nuclei. The particle growth step involves crystallization at a relatively low pH value and therefore disadvantageously makes impurities, particularly, sulfate groups or chlorine more likely to remain. Further, the nuclei formation step involves the crystallization of fine particles. Accordingly, even when the particles are grown in the subsequent particle growth step, high density will be difficult to achieve, making impurities more likely to remain within the particles.

In view of the problems with the related art, an object of the present invention is to provide a precursor of a positive electrode active material that allows for obtaining a nonaqueous electrolyte secondary battery containing a reduced amount of impurities and having high capacity, small irreversible capacity, and excellent coulomb efficiency and reaction resistance, and production method thereof.

Solution to Problem

To solve the above problems, the inventors intensively considered a reduction in the amount of impurities. As a result, the inventors found that nickel-cobalt-manganese composite hydroxide containing fewer impurities could be obtained by washing nickel-manganese composite hydroxide having a particular composition and structure with an aqueous carbonate solution and that use of this composite hydroxide as a precursor allowed for the production of a positive electrode active material containing fewer impurities and allowing for obtaining excellent battery characteristics, and then completed the present invention.

A method for producing a precursor of a positive electrode active material for nonaqueous electrolyte secondary batteries of the present invention is a method for producing a precursor of a positive electrode active material for nonaqueous electrolyte secondary batteries having a hollow structure or porous structure. The method includes obtaining the precursor by washing nickel-manganese composite hydroxide particles represented by the general formula (1) and having a pore structure in which pores are present within the particles, with an aqueous carbonate solution having a carbonate concentration of 0.1 mol/L or more, where $0.2 \leq x \leq 0.8$; $0 \leq y < 0.3$; $0.07 < z \leq 0.8$; $0 \leq t \leq 0.1$; $x+y+z+t=1$; and M is at least one element selected from Mg, Ca, Ba, Sr, Al, Ti, V, Cr, Zr, Mo, Hf, Ta, and W.

Preferably, a porosity measured by observing a cross-section of the nickel-manganese composite hydroxide particles is 15% or more.

Preferably, the aqueous carbonate solution is an aqueous solution of at least one selected from potassium carbonate, sodium carbonate, potassium bicarbonate, and sodium bicarbonate, and a pH of the aqueous carbonate solution is 11.2 or more.

Preferably, the nickel-manganese composite hydroxide particles are washed with the aqueous carbonate solution having a temperature of 15 to 50° C.

Preferably, the nickel-manganese composite hydroxide particles are obtained by effecting neutralization and crystallization by charging a mixed aqueous solution of a metal compound containing nickel and manganese and optionally cobalt and the element M and an aqueous solution containing an ammonium ion donor into a warmed reaction vessel while adding, to a reaction solution, a sufficient amount of an aqueous alkali metal hydroxide solution to maintain alkalinity as necessary, and in the neutralization crystallization, a nuclei formation step of forming nuclei and a particle growth step of growing the formed nuclei are separately performed by controlling a pH value of the reaction solution.

Preferably, the pH value in the nuclei formation step is controlled so as to become 12.0 to 14.0 at a reference solution temperature of 25° C., and the pH value in the particle growth step is controlled so as to become 10.5 to 12.5 at a reference solution temperature of 25° C. and to be lower than the pH value in the nuclei formation step.

Preferably, the mixed aqueous solution contains a chloride of at least one of nickel, manganese, and cobalt.

A precursor of a positive electrode active material for nonaqueous electrolyte secondary batteries of the present invention is a precursor of a positive electrode active material for nonaqueous electrolyte secondary batteries having a hollow structure or porous structure. The precursor consists of nickel-manganese composite hydroxide particles represented by the general formula (1) and having a pore structure in which pores are present within the particles. The precursor has a sulfate group content of 0.4% by mass or less and a sodium content of 0.035% by mass or less. $Ni_xCo_yMn_zM_t$ $(OH)_2$ ... General Formula (1)

where $0.2 \leq x \leq 0.8$; $0 \leq y < 0.3$; $0.07 < z \leq 0.8$; $0 \leq t \leq 0.1$; $x+y+z+t=1$; and M is at least one element selected from Mg, Ca, Ba, Sr, Al, Ti, V, Cr, Zr, Mo, Hf, Ta, and W.

Preferably, the precursor has a chlorine content of 0.1% by mass or less.

A method for producing a positive electrode active material for nonaqueous electrolyte secondary batteries of the present invention is a method for producing a positive electrode active material for nonaqueous electrolyte secondary batteries, the positive electrode active material consisting of lithium-nickel-manganese composite oxide that is represented by the general formula (2) and has a hollow structure or porous structure. The method includes a mixing step of mixing the precursor of the positive electrode active material for nonaqueous electrolyte secondary batteries with a lithium compound to obtain a lithium mixture and a firing step of firing the lithium mixture in an oxidizing atmosphere at 800 to 1100° C. to obtain lithium-nickel-manganese composite oxide.

$Ni_xCo_yMn_zM_t(OH)_2$  General Formula (1)

$Li_aNi_xCo_yMn_zM_tO_2$  General Formula (2)

where $0.95 \leq a \leq 1.20$; $0.2 \leq x \leq 0.8$; $0 \leq y < 0.3$; $0.07 < z \leq 0.8$; $0 \leq t \leq 0.1$; $x+y+z+t=1$; and M is at least one element selected from Mg, Ca, Ba, Sr, Al, Ti, V, Cr, Zr, Mo, Hf, Ta, and W.

Preferably, the lithium compound is at least one selected from a group consisting of a hydroxide, oxyhydroxide, oxide, carbonate, nitrate, and halide of lithium.

A positive electrode active material for nonaqueous electrolyte secondary batteries of the present invention consists of lithium-nickel-manganese composite oxide particles represented by the general formula (2) and having a hollow structure or porous structure. The positive electrode active material has a sulfate group content of 0.4% by mass or less and a sodium content of 0.035% by mass or less.

$$Li_aNi_xCo_yMn_zM_tO_2 \qquad \text{General Formula (2)}$$

where $0.95 \leq a \leq 1.20$; $0.2 \leq x \leq 0.8$; $0 \leq y < 0.3$; $0.07 < z \leq 0.8$; $0 \leq t \leq 0.1$; $x+y+z+t=1$; and M is at least one element selected from Mg, Ca, Ba, Sr, Al, Ti, V, Cr, Zr, Mo, Hf, Ta, and W.

Preferably, the positive electrode active material for nonaqueous electrolyte secondary batteries has a chlorine content of 0.05% by mass or less.

A nonaqueous electrolyte secondary battery of the present invention uses the positive electrode active material for nonaqueous electrolyte secondary batteries.

Advantageous Effects of the Invention

The present invention provides the precursor that allows for obtaining a positive electrode active material for nonaqueous electrolyte secondary batteries containing a small amount of residual impurities and having high capacity, small irreversible capacity, and excellent coulomb efficiency and reaction resistance, and production method thereof. The production method of this precursor is easy and productive and produces, in a small amount, impurities which corrode the firing furnace, peripheral equipment, and the like. Thus, the damage to the production facilities can be reduced. Further, the method for producing the positive electrode active material of the present invention allows for easily obtaining a positive electrode active material for nonaqueous electrolyte secondary batteries having high capacity, small irreversible capacity, and excellent coulomb efficiency and reaction resistance and therefore is extremely industrially valuable.

BRIEF DESCRIPTION OF THE DRAWINGS

FIG. 1 is a sectional view of a coin battery used to evaluate a battery.

DESCRIPTION OF EMBODIMENTS

Now, detailed description will be made on a precursor of a positive electrode active material for nonaqueous electrolyte secondary batteries and production method thereof and a method for producing a positive electrode active material for nonaqueous electrolyte secondary batteries using this precursor according to the present embodiment. The embodiment below is only illustrative, and the present invention includes the embodiment, as well as forms obtained by making various changes or modifications thereto on the basis of the knowledge of those skilled in the art.

1. Method for Producing Precursor of Positive Electrode Active Material for Nonaqueous Electrolyte Secondary Batteries (1) Composition of Nickel-Manganese Composite Hydroxide Particles A method for producing a precursor of a positive electrode active material for nonaqueous electrolyte secondary batteries of the present embodiment (hereafter also simply referred to as the "precursor") includes obtaining the precursor by washing nickel-manganese composite hydroxide particles represented by General Formula (1) below and having a pore structure in which pores are present within the particles (hereafter also simply referred to as the "composite hydroxide particles"), with an aqueous carbonate solution having a carbonate concentration of a 0.1 mol/L or more.

$$Ni_xCo_yMn_zM_t(OH)_2 \qquad \text{General Formula (1)}$$

where $0.2 \leq x \leq 0.8$; $0 \leq y < 0.3$; $0.07 < z \leq 0.8$; $0 \leq t \leq 0.1$; $x+y+z+t=1$; and M is at least one element selected from Mg, Ca, Ba, Sr, Al, Ti, V, Cr, Zr, Mo, Hf, Ta, and W.

In General Formula (1), x represents the nickel content of the composite hydroxide particles and is $0.2 \leq x \leq 0.8$, preferably $0.35 \leq x \leq 0.6$, more preferably $0.4 \leq x \leq 0.6$. By using, as the precursor, the composite hydroxide particles having a nickel content in the above range, a positive electrode active material having excellent discharge capacity can be obtained.

In General Formula (1), y represents the cobalt content of the composite hydroxide particles and is $0 \leq y < 0.3$, preferably $0.1 \leq y \leq 0.25$, more preferably $0.1 \leq y \leq 0.2$. By using, as the precursor, the composite hydroxide particles having a cobalt content in the above range, a positive electrode active material having excellent discharge capacity and cycle characteristics can be obtained.

In General Formula (1), z represents the manganese content of the composite hydroxide particles and is $0.07 < z \leq 0.8$, preferably $0.1 \leq z \leq 0.6$, more preferably $0.1 \leq z \leq 0.5$. By using, as the precursor, the composite hydroxide particles having a manganese content in the above range, a positive electrode active material having excellent cycle characteristics and thermal stability can be obtained.

In General Formula (1), t represents the element M content of the composite hydroxide particles and is $0 \leq t \leq 0.1$, preferably 00.07, more preferably 00.05. By using, as the precursor, the composite hydroxide particles having an M content in the above range, a positive electrode active material maintaining discharge capacity and having excellent cycle characteristics and thermal stability can be obtained.

Note that the composition ratio among nickel, cobalt, manganese, and element M in the composite hydroxide particles (the precursor) is also maintained in lithium-nickel-manganese composite oxide particles (a positive electrode active material) to be discussed later.

(2) Internal Structure of Nickel-Manganese Composite Hydroxide Particles

Since the composite hydroxide particles used in the present embodiment have a pore structure in which pores are present within the particles, it is possible to obtain lithium-nickel-manganese composite oxide particles having a hollow structure or porous structure (hereafter also simply referred to as the "composite oxide particles"). A positive electrode active material consisting of the composite oxide particles having a hollow structure or porous structure contacts an electrolyte solution in a larger area and therefore exhibits excellent output characteristics.

As used herein, the term "the composite hydroxide particles having a pore structure in which pores are present within the particles" refers to particles having a structure in which many pores are present among primary particles forming secondary particles and also refers to composite hydroxide particles from which a positive electrode active material having a hollow structure or porous structure can be formed after a firing step (to be discussed later). Examples of such composite hydroxide particles include composite hydroxide particles that consist of secondary particles each having a central portion consisting of fine primary particles and a shell consisting of larger primary particles than the fine primary particles outside the central portion and that have many pores among the fine primary particles, as disclosed in Patent Literature 2. The composite hydroxide particles may include multiple central portions each consisting of fine primary particles. The entire composite hydroxide particles may have many pores among primary particles. The structures listed above may be combined. The "hollow structure" of the positive electrode active material refers to a structure in which each particle includes a hollow consisting of a central space and a shell outside the hollow, and "the porous structure" thereof refers to a structure in which pores are distributed throughout the particles.

The pore structure and the hollow structure or porous structure are identified by observing cross-sections of the composite hydroxide particles and composite oxide particles using a scanning electron microscope.

For the composite hydroxide particles having the pore structure and the composite oxide particles having the hollow structure or porous structure, the porosities thereof measured by cross-sectional observation are 5% or more, preferably 15% or more, more preferably 15 to 85%. Thus, it is possible to cause the obtained positive electrode active material to contact an electrolyte solution in a sufficiently large area without excessively reducing the bulk density of the positive electrode active material.

The porosity can be measured by observing any cross-section of the composite hydroxide particles or composite oxide particles using a scanning electron microscope and then analyzing the resulting image. For example, the porosity can be obtained by embedding multiple composite hydroxide particles or composite oxide particles in a resin or the like, subjecting these particles to cross-section polishing or the like to allow them to be cross-sectionally observed, then measuring pores within the secondary particles (hollows in a hollow structure or pores in a porous structure) as being black using image analysis software (WinRoof 6.1.1 or the like), measuring dense portions in the secondary particle edges (shells in a hollow structure, or cross-sections of primary particles forming a pore structure or porous structure) as being white, and calculating the area of [black portion/(black portion+while portion)] with respect to any 20 or more particles.

(3) Method for Producing Nickel-Manganese Composite Hydroxide Particles

Any method, including known conventional ones, may be used to produce the composite hydroxide particles used in the present embodiment as long as composite hydroxide satisfying General Formula (1) above and having a pore structure in pores are present within the particles is obtained.

One example is a method of effecting neutralization and crystallization by charging, into a warmed reaction vessel, a mixed aqueous solution of a metal compound containing nickel and manganese and, optionally, cobalt and at least one element M selected from Mg, Ca, Ba, Sr, Al, Ti, V, Cr, Zr, Mo, Hf, Ta, and W and an aqueous solution containing an ammonium ion donor while properly charging a sufficient amount of an aqueous alkali metal hydroxide solution to keep the reaction solution alkaline.

In the neutralization and crystallization, it is preferred to separately perform a nuclei formation step of forming nuclei and a particle growth step of growing the nuclei by controlling the pH value of the reaction solution. This results in the production of nickel-manganese composite hydroxide particles consisting of secondary particles which are agglomerations of primary particles and having a pore structure.

As used herein, the term "separately perform a nuclei formation step and a particle growth step" does not mean that a nuclei formation reaction and a particle growth reaction proceed in the same layer in the same period as in the conventional continuous crystallization process, but rather means that the period in which a nuclei formation reaction (a nuclei formation step) mainly occurs and the period in which a particle growth reaction (a particle growth step) mainly occurs are separated clearly.

Further, in terms of the uniformity, stability, or the like of the particle diameter, it is preferred to control the pH value in the nuclei formation step so as to become 12.0 to 14.0 at a reference solution temperature of 25° C. and to control the pH value in the particle growth step so as to become 10.5 to 12.5 at a reference solution temperature of 25° C. and so as to become lower than the pH value in the nuclei formation step. It is also preferred to control the pH value in the particle growth step so as to become lower than the pH value in the nuclei formation step by 0.5 or more.

For the air atmospheres in the nuclei formation step and particle growth step, it is preferred to use, for example, an oxidizing atmosphere having an oxygen concentration of 1% by volume or more in the nuclei formation step and to change the oxidizing atmosphere to a mixed atmosphere of oxygen and inert gas having an oxygen concentration of 1% by volume or less in the middle of the particle growth step.

That is, by using the oxidizing atmosphere in the nuclei formation step and the initial part of the particle growth step, a central portion consisting of fine primary particles and including many small pores can be formed. Also, by changing the oxidizing atmosphere to a weakly-oxidizing to non-oxidizing atmosphere in the subsequent particle growth step, it is possible to form a particle structure in which a shell consisting of larger tabular primary particles than the fine primary particles is present outside the central portion. In the case of the composite hydroxide particles having such a particle structure, the fine primary particles forming the central portion are absorbed by the shell in the firing step for obtaining a positive electrode active material. Thus, composite oxide particles having a hollow structure are obtained.

Further, by adjusting the time at which the atmosphere is changed in the particle growth step, it is possible to control the size of the hollows of composite oxide particles having a hollow structure.

On the other hand, by using a weakly-oxidizing to non-oxidizing atmosphere, that is, an mixed atmosphere of oxygen and inert gas having a oxygen concentration of 1% by volume or less in both the nuclei formation step and particle growth step, it is possible to obtain composite hydroxide particles having a pore structure in which primary particles formed in the nuclei formation step are grown and in which many pores are present among the primary particles. In the case of the composite hydroxide particles having such a particle structure, the pores are left and enlarged when the primary particles are sintered and grown in the firing step for obtaining a positive electrode active material. Thus, lithium-nickel composite oxide particles (a positive electrode active material) having a porous structure are obtained.

Examples of the metal compound containing nickel, manganese, and cobalt include, but not limited to, sulfide, nitrate, and chloride. Among these, sulfide, or chloride is preferably used in terms of the ease of drainage, or the environmental load. Particularly in terms of the environmental load, a chloride of at least one of nickel, manganese, and cobalt is preferably used.

Examples of the metal compound containing at least one element M selected from Mg, Ca, Ba, Sr, Al, Ti, V, Cr, Zr, Mo, Hf, Ta, and W include, but not limited to, magnesium sulfate, calcium sulfate, sodium aluminate, aluminum sulfate, titanium sulfate, peroxotitanic acid ammonium, titanium potassium oxalate, vanadium sulfate, ammonium vanadate, chromium sulfate, potassium chromate, zirconium sulfate, zirconium nitrate, ammonium molybdate, sodium tungstate, and ammonium tungstate.

The alkaline metal hydroxide may be a known material, and examples thereof include, but not limited to, sodium hydroxide and potassium hydroxide.

Examples of the ammonium ion donor include, but not limited to, ammonia, ammonium sulfate, ammonium chloride, ammonium carbonate, and ammonium fluoride.

The concentration of ammonium ions in the nuclei formation step and particle growth step is preferably 3 to 25 g/L, more preferably 5 to 20 g/L so that the concentration of metal ions is kept constant to stabilize the shape or particle diameter.

(4) Washing with Aqueous Carbonate Solution

A method for producing the precursor of the present embodiment involves obtaining the precursor by washing nickel-manganese composite hydroxide particles having a pore structure in which pores are present within the particles, with an aqueous carbonate solution having a concentration of 0.1 mol/L or more, preferably 0.15 to 2.00 mol/L, more preferably 0.20 to 1.50 mol/L. By using an aqueous carbonate solution having a concentration of 0.1 mol/L or more for washing, impurities, particularly, sulfate groups, chlorine, or the like in the composite hydroxide particles can be efficiently eliminated owing to the effect of ion exchange with carbonate ions in the aqueous carbonate solution. If the composite hydroxide particles having a pore structure are washed with water or an aqueous solution of an alkali metal such as sodium hydroxide, which has been used conventionally, the impurities inside the particles are difficult to eliminate. Washing with the aqueous carbonate solution is effective.

The pH of the aqueous carbonate solution used for washing is preferably 11.2 or more, more preferably 11.5 or more at a reference temperature of 25° C. Use of an aqueous carbonate solution having a pH of 11.2 or more allows sulfate groups or chlorine, which form acid, to be more efficiently eliminated. Since an aqueous carbonate solution is used, the upper limit of the pH is on the order of 12.5 at a reference temperature of 25° C.

The aqueous carbonate solution is preferably an aqueous solution of at least one selected from potassium carbonate ($K_2CO_3$), sodium carbonate ($Na_2CO_3$), potassium bicarbonate, and sodium hydrogen carbonate. Since lithium carbonate, calcium carbonate, and barium carbonate have low water-solubility, an aqueous solution in which a sufficient amount of such carbonate is dissolved may not be obtained.

If sodium carbonate, for example, is used as carbonate, the concentration of the aqueous solution is preferably 0.2 mol/L or more, more preferably 0.25 to 1.50 mol/L. Since sodium carbonate has high water-solubility, use of an aqueous solution thereof having a concentration of 0.2 mol/L or more allows impurities such as sulfate groups or chlorine to be more efficiently eliminated.

The temperature of the aqueous carbonate solution is preferably 15 to 50° C. When the temperature of the aqueous solution falls within the above range, ion exchange is activated, and the impurities are efficiently eliminated.

The amount of the aqueous carbonate solution used for washing may be any amount as long as sufficient washing can be performed so that the sulfate group content of the composite hydroxide particles is 0.4% by mass or less and the sodium content thereof is 0.035% by mass or less. If an aqueous solution of sodium carbonate, for example, is used, the amount thereof is preferably 1000 mL or more, more preferably 2000 to 5000 mL with respect to 1000 g of the nickel-manganese composite hydroxide. If the amount is 1000 mL or less, the carbonate ions may not sufficiently substitute for the impurity ions, and sufficient washing effects may not be obtained.

Typically, washing with the aqueous carbonate solution is performed for 0.5 to 2 hours. However, the washing time may be any length of time as long as sufficient washing can be performed so that the sulfate group content of the composite hydroxide particles becomes 0.4% by mass or less and the sodium content thereof becomes 0.035% by mass or less.

Examples of the washing method include 1) a typical washing method of adding the nickel-manganese composite hydroxide particles to the aqueous carbonate solution to make a slurry and then filtering the slurry and 2) a filter passage washing method of feeding a slurry including the composite hydroxide particles generated by effecting neutralization and crystallization to a filter such as a filter press and then passing the aqueous carbonate solution through the filter. The filter passage washing method is preferable, since it eliminates impurities efficiently, allows filtration and washing to be continuously performed in the same equipment, and is therefore productive.

After performing washing with the aqueous carbonate solution, washing with pure water is performed optionally. Washing with pure water is preferable, since it eliminates cation impurities such as sodium.

Washing with pure water may be performed using a typical method. If filter passage washing with the aqueous carbonate solution is performed, it is preferred to perform filter passage washing with the aqueous carbonate solution and then continuously filter passage washing with pure water.

2. Precursor of Positive Electrode Active Material for Nonaqueous Electrolyte Secondary Batteries A precursor of a positive electrode active material for nonaqueous electrolyte secondary batteries of the present embodiment consists of nickel-manganese composite hydroxide particles represented by General Formula (1) below and having a pore structure and has a sulfate group content of 0.4% by mass or less and a sodium content of 0.035% by mass or less.

$$Ni_xCo_yMn_zM_t(OH)_2 \qquad \text{General Formula(1)}$$

where $0.2 \leq x \leq 0.8$; $0 \leq y < 0.3$; $0.07 < z \leq 0.8$; $0 \leq t \leq 0.1$; $x+y+z+t=1$; and M is at least one element selected from Mg, Ca, Ba, Sr, Al, Ti, V, Cr, Zr, Mo, Hf, Ta, and W.

Sulfate groups contained in the precursor are not reduced in the firing step for producing a positive electrode active material but rather remain in the positive electrode active material. For this reason, the sulfate groups need to be sufficiently reduced in the precursor in advance. By using the precursor having a sulfate group content of 0.4% by mass or less, preferably 0.35% by mass or less, more preferably 0.3% or less by mass, a positive electrode active material having a sulfate group content of 0.4% by mass or less, preferably 0.35% by mass or less can be obtained.

Sodium contained in the precursor is also not reduced in the firing step for producing a positive electrode active material but rather may be increased due to lithium salt, which is a mixed raw material. For this reason, the sodium content of the precursor needs to be sufficiently reduced in advance so that it becomes 0.035% by mass or less, preferably 0.030% by mass or less, more preferably 0.028% by mass or less.

The chlorine content of the precursor is preferably 0.1% by mass or less, more preferably 0.05% by mass or less, even more preferably 0.02% by mass or less. While chlorine has less influence on a positive electrode active material than sulfate groups, it has an adverse effect on a firing furnace or the like during the production of a positive electrode active material. For this reason, chlorine is preferably sufficiently reduced in the precursor in advance.

The sulfate group content, sodium content, and chlorine content of the precursor can be set to the above ranges by properly adjusting the concentration, amount, temperature, or the like of the aqueous carbonate solution with which the nickel-manganese composite hydroxide is washed.

3. Method for Producing Positive Electrode Active Material for Nonaqueous Electrolyte Secondary Batteries A method for producing a positive electrode active material for nonaqueous electrolyte secondary batteries of the present embodiment includes 1) a mixing step of mixing the precursor and a lithium compound to obtain a lithium mixture and 2) a firing step of firing the lithium mixture at 800 to 1100° C. in an oxidative atmosphere to obtain lithium-nickel-manganese composite oxide particles represented by General Formula (2) below.

  General Formula (2)

where $0.95 \leq a \leq 1.20$; $0.2 \leq x \leq 0.8$; $0 \leq y < 0.3$; $0.07 < z \leq 0.8$; $0 \leq t \leq 0.1$; $x+y+z+t=1$; and M is at least one element selected from Mg, Ca, Ba, Sr, Al, Ti, V, Cr, Zr, Mo, Hf, Ta, and W.

The respective steps will be described below.

(1) Mixing Step

The mixing step is a step of mixing the precursor and a lithium compound to obtain a lithium mixture.

Preferably, the mixing ratio between the precursor and lithium compound is adjusted so that the molar ratio of lithium (Li) to metal elements (Me) other than lithium (Li/Me) is 0.95 to 1.20, preferably 1.00 to 1.15. That is, the precursor and lithium compound are mixed in such a manner that the molar ratio (Li/Me) of the lithium mixture becomes the same as the molar ratio (Li/Me) of a positive electrode active material of the present embodiment. The reason is that the molar ratio (Li/Me) does not vary between before and after the firing step and therefore the molar ratio (Li/Me) of the lithium mixture obtained in the mixing step becomes the molar ratio (Li/Me) of the positive electrode active material. Note that the value of a in General Formula (2) is similar to the molar ratio (Li/Me) of the positive electrode active material, since the composition ratio (x+y+z+t) of Me is 1.

If the positive electrode active material obtained has a molar ratio (Li/Me) of less than 0.95, the battery capacity in charge/discharge cycles may be reduced. Also, if the molar ratio is more than 1.20, the positive electrode of a battery produced using the positive electrode active material would have larger internal resistance.

Examples of the lithium compound include, but not limited to, at least one selected from a group consisting of a hydroxide, oxyhydroxide, oxide, carbonate, nitrate, and halide of lithium. A hydroxide and/or carbonate of lithium are more preferably used.

The mixing step is performed using a dry mixer such as a V blender, a mixing/granulation apparatus, or the like.

A roasting step may be additionally performed before the mixing step.

Specifically, while the precursor, which is composite hydroxide, may be mixed with the lithium compound, the remaining water in the precursor may be eliminated by additionally performing a roasting step before the mixing step. The composite hydroxide may also be converted into nickel-manganese composite oxide by performing a roasting step.

By performing the roasting step, it is possible to more easily control the ratio between lithium and the metal elements other than lithium, as well as to stabilize the composition of lithium-nickel-manganese composite oxide particles to be obtained and to suppress the non-uniformity of the composition in the firing step. For example, the roasting step involves firing the precursor at 150 to 1000° C. in an oxidizing atmosphere. To convert the precursor into nickel-manganese composite oxide, the precursor is roasted preferably at 400 to 900° C., more preferably at 400 to 800° C.

If the roasting temperature is less than 150° C., the remaining water in the precursor may not be sufficiently eliminated. If the roasting temperature is more than 1000° C., lithium-nickel-manganese composite oxide particles having low crystallinity may be produced. This is because such roasting temperature may abruptly grow the primary particles forming the particles of the precursor and thus may excessively reduce the reaction area of the roasted precursor, resulting in a reduction in the reactivity with lithium. On the other hand, the roasting step at a temperature of 300° C. or less can serve also as a drying step in a crystallization step for obtaining composite hydroxide particles.

(2) Firing Step

The firing step is a step of firing the obtained lithium mixture at 800 to 1100° C., preferably at 850 to 1050° C., more preferably 900 to 1000° C. in an oxidizing atmosphere. That is, while thermal treatment at a temperature more than 800° C. results in the production of lithium-nickel-manganese composite oxide, thermal treatment at a temperature less than 800° C. results in the production of that whose crystal is undeveloped and whose structure is unstable and is easily broken due for example to phase transition caused by a charge/discharge. Also, thermal treatment at a temperature more than 1100° C. results in the production of lithium-nickel-manganese composite oxide which includes abnormally grown particles and has a collapsed layered structure and a low specific surface area, making it difficult to insert and desorb lithium ions.

Note that when the temperature is raised to 800° C. or more in the firing step, the nickel-manganese composite hydroxide is converted into composite oxide and that the reaction between the precursor and the lithium compound substantially ends at about 700° C. For this reason, firing at up to 700° C. and firing at 700° C. or more may be performed in different equipment or as different steps. By performing firing as two different steps, it is possible to prevent gas components, such as water vapor and carbon dioxide, generated by the reaction between the nickel-manganese composite hydroxide and lithium compound from being subjected to firing at 700° C. or more, which aims to increase crystallinity. Thus, composite hydroxide particles having higher crystallinity can be obtained.

Further, after eliminating crystal water or the like from the lithium mixture, the lithium mixture may be kept at a temperature in a range of, for example, 600 to 900° C. and lower than the firing temperature for one hour or more and then calcined before fired so that the lithium mixture uniformly reacts in a temperature range in which crystal growth proceeds The firing step is performed using a firing furnace, such as an electric furnace, kiln, tube furnace, or pusher furnace, adjusted to a gas atmosphere having an oxygen concentration of 20% by mass or more, such as an oxygen atmosphere or a dehumidified, decarbonated dry air atmosphere.

By using the precursor of the present embodiment as a raw material and using the above production method, there can be obtained an positive electrode active material for nonaqueous electrolyte secondary batteries consisting of lithium-nickel-manganese composite oxide particles having a sulfate group content of 0.4% by mass or less and a sodium content of 0.035% by mass or less, and, preferably, having a chlorine content of 0.05% by mass or less.

4. Positive Electrode Active Material for Nonaqueous Electrolyte Secondary Batteries A positive electrode active material for nonaqueous electrolyte secondary batteries of the present embodiment consists of lithium-nickel-manganese composite oxide particles represented by General Formula (2) below and having a hollow structure or porous structure and has a sulfate group content of 0.4% by mass or less and a sodium content of 0.035% by mass or less.

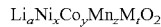
$$Li_aNi_xCo_yMn_zM_tO_2 \quad \text{General Formula (2)}$$

where $0.95 \le a \le 1.20$; $0.2 \le x \le 0.8$; $0 \le y < 0.3$; $0.07 < z \le 0.8$; $0 \le t \le 0.1$; $x+y+z+t=1$; and M is at least one element selected from Mg, Ca, Ba, Sr, Al, Ti, V, Cr, Zr, Mo, Hf, Ta, and W.

In General Formula (2), x, y, z, and t can take values similar to x, y, z, and t in General Formula (1) representing the composite hydroxide particles described above, and a can take a value similar to Li/Me mixed in the mixing step.

The sulfate group content of the positive electrode active material is 0.4% by mass or less, preferably 0.35% by mass or less, more preferably 0.3% by mass or less. By using this positive electrode active material, it is possible to obtain a battery having reduced irreversible capacity, increased coulomb efficiency, and increased capacity. It is also possible to suppress excess lithium to be accumulated on the negative electrode and thus to improve safety.

The sodium content of the positive electrode active material is 0.035% by mass or less, preferably 0.030% by mass or less. As with sulfate groups, sodium also increases the irreversible capacity. By using the positive electrode active material having a sodium content of 0.035% by mass or less, it is possible to obtain a battery having reduced irreversible capacity and increased coulomb efficiency. Also, sodium remaining in the positive electrode active material increases the resistance value of the positive electrode active material. Accordingly, by using the positive electrode active material having a sodium content in the above range, the output characteristics can be improved.

Chlorine also increases the irreversible capacity. For this reason, the chlorine content of the positive electrode active material is preferably 0.05% by mass or less, more preferably 0.01% by mass or less, even more preferably 0.005% by mass or less.

The lithium-nickel-manganese composite oxide particles forming the positive electrode active material of the present embodiment have a hollow structure or porous structure. Thus, the positive electrode active material can contact an electrolyte solution in a larger area and therefore can exhibit increased output characteristics. To further improve the output characteristics, the porosity measured by cross-sectional observation is preferably 15% or more, more preferably 15 to 85%. The particle structure or porosity can be identified or obtained in a manner similar to that for the composite hydroxide particles described above.

5. Nonaqueous Electrolyte Secondary Battery

As with a typical lithium-ion secondary battery, a nonaqueous electrolyte secondary battery of the present embodiment includes elements, such as a positive electrode, a negative electrode, and a nonaqueous electrolyte solution. The respective elements will be described in detail below. The embodiment below is only illustrative, and nonaqueous electrolyte secondary batteries of the present invention include the embodiment, as well as forms obtained by making various changes or modifications thereto on the basis of the knowledge of those skilled in the art. The nonaqueous electrolyte secondary battery of the present embodiment may be used for any application.

(1) Positive Electrode

A positive electrode mixture material for forming a positive electrode and materials included in the mixture material will be described. The above particulate positive electrode active material, a conductive material, and a binder are mixed. Optionally, activated carbon and a solvent for viscosity adjustment or other purposes are added and kneaded to prepare a positive electrode mixture material paste. The mixing ratio among the components of the positive electrode mixture material may be adjusted in accordance with the required performance of a lithium secondary battery.

For example, as with the positive electrode of a typical lithium secondary battery, the positive electrode mixture material paste may contain 60 to 95% by mass of the positive electrode active material, 1 to 20% by mass of the conductive material, and 1 to 20% by mass of the binder with respect to all the mass of the solid content of the positive electrode mixture material except for the solvent of 100% by mass.

By applying the positive electrode mixture material paste obtained, for example, onto a collector formed of an aluminum foil, drying it to disperse the solvent, and optionally pressing it by roll press to increase the electrode density, a sheet-shaped positive electrode can be obtained. The sheet-shaped positive electrode thus obtained can be used in the target battery, for example, by cutting it into a size suitable for the battery. The method for producing a positive electrode described above is only illustrative, and other methods may be used.

Examples of the conductive material used to produce the positive electrode include carbon black-based materials, such as graphite (natural graphite, artificial graphite, expanded graphite, etc.), acetylene black, and Ketjen black.

The binder has a function of binding active material particles together. Examples thereof include fluorine-containing resins, such as polyvinylidene fluoride, polytetrafluoroethylene, ethylene propylene diene rubber, and fluororubber, and thermoplastic resins, such as styrene butadiene, cellulose-based resin, polyacrylic acid, polypropylene, and polyethylene.

Optionally, a solvent for dispersing the positive electrode active material, conductive material, activated carbon, and the like and dissolving the binder may be added to the positive electrode mixture material. For example, an organic solvent, such as N-methyl-2-pyrrolidone, may be used as the solvent. Further, activated carbon may be added to the positive electrode mixture material to increase the electric double layer capacity.

(2) Negative Electrode

A negative electrode is formed by mixing a binder with metal lithium, lithium alloy, or the like or a negative electrode active material which can occlude and desorb lithium ions, adding an appropriate solvent to the mixture, applying the resulting pasty negative electrode mixture material onto a collector formed of a metal foil, such as copper, drying the mixture material, and optionally compressing it to increase the electrode density.

Examples of the negative electrode active material include natural graphite, artificial graphite, a fired body of an organic compound such as phenol resin, and the powder of a carbon material such as coke. As in the positive electrode, the binder used in the negative electrode may be a fluorine-containing resin, such as polyvinylidene fluoride. The solvent for dispersing the negative active material and binder may be an organic solvent, such as N-methyl-2-pyrrolidone.

(3) Separator

A separator is sandwiched between the positive electrode and negative electrode. The separator separates the positive electrode and negative electrode and holds an electrolyte. It may be a thin, porous film formed of polyethylene, polypropylene, or the like.

(4) Nonaqueous Electrolyte Solution

A nonaqueous electrolyte solution is prepared by dissolving a lithium salt serving as a supporting electrolyte in an organic solvent. The organic solvent may be, for example, one or combinations of two or more selected from cyclic carbonates such as ethylene carbonate, propylene carbonate, butylene carbonate, and trifluoropropylene carbonate, chain carbonates such as diethyl carbonate, dimethyl carbonate, ethylmethyl carbonate, and dipropyl carbonate, ether components such as tetrahydrofuran, 2-methyltetrahydrofuran, and dimethoxyethane, sulfur compounds such as ethyl methyl sulfone and butanesultone, phosphorus compounds such as triethyl phosphate and trioctyl phosphate, and the like.

Examples of the supporting electrolyte include $LiPF_6$, $LiBF_4$, $LiClO_4$, $LiAsF_6$, $LiN(CF_3SO_2)_2$, and composite salts thereof.

The nonaqueous electrolyte solution may contain a radical scavenger, a surfactant, a flame retardant, or the like.

(5) Shape and Configuration of Battery

The nonaqueous electrolyte secondary battery may take various shapes, including a cylindrical shape and a multilayer shape.

Whatever form it may take, the nonaqueous electrolyte secondary battery can be completed by stacking the positive electrode and negative electrode with the separator therebetween to form an electrode body, impregnating this electrode body with the nonaqueous electrolyte solution, connecting a positive electrode collector and a positive electrode terminal leading to outside and connecting a negative electrode collector and a negative electrode terminal leading to outside using collection leads or the like, and hermetically sealing these components in a battery case.

EXAMPLES

Hereafter, the present invention will be described in more detail using Examples and Comparative Examples. However, the present invention is not limited to these Examples. The metals of nickel-manganese composite hydroxides/lithium-nickel-manganese composite oxides used in Examples and Comparative Examples were analyzed and evaluated using the following methods.

(1) Composition analysis: the composition was measured by ICP spectrometry.
(2) Sulfate group content: sulfur was quantitatively analyzed by ICP spectrometry and then the sulfate group content was obtained by multiplying the amount of sulfur by a coefficient assuming that all sulfur was oxidized to become sulfate groups ($SO_4^{2-}$).
(3) Na and Cl contents: the Na and Cl contents were measured by atomic absorption spectrometry.
(4) Charge/discharge capacity and coulomb efficiency:

A coin-type battery was produced and left alone for about 24 hours; after an open circuit voltage (OCV) was stabilized, the battery was charged to a cut-off voltage of 4.3 V with the current density with respect to the positive electrode set to 0.5 $mA/cm^2$; after left at rest for one hour, the battery was discharged to a cut-off voltage of 3.0 V; the then capacity was defined as the discharge capacity; and the ratio of the discharge capacity to the then charge capacity (discharge capacity/charge capacity) was defined as the coulomb efficiency (%).

(5) Reaction resistance:

The reaction resistance was obtained by charging a coin-type battery at a charge potential of 4.1 V, creating an AC impedance Nyquist plot using a frequency response analyzer and a potentio-galvanostat (1255B available from Solartron), and calculating the value of the positive electrode resistance by performing fitting calculation using an equivalent circuit.

Example 1

Production of Precursor of Positive Electrode Active Material Nuclei Formation Step Water was charged into a reaction vessel (34 L) until the water fills half the volume thereof, and the temperature in the vessel was set to 40° C. while stirring the water using an inclined paddle-type impeller at 500 rpm. At this time, an air atmosphere (oxygen concentration: 21% by volume) was used in the reaction vessel. Proper amounts of a 25% by mass sodium hydroxide aqueous solution and 25% by mass ammonia water were added to the water in the reaction vessel. The pH value of the reaction solution in the vessel was adjusted so as to become 13.0 at a reference solution temperature of 25° C., and the concentration of ammonia in the reaction solution was adjusted so as to become 15 g/L. Thus, a pre-reaction aqueous solution was obtained.

Then, nickel sulfate, manganese sulfate, and cobalt chloride (the molar ratio among the metal elements Ni:Co:Mn=50:20:30) were dissolved in water, and the resulting 2.0 mol/L mixed aqueous solution was added to the pre-reaction aqueous solution in the reaction vessel at a rate of 88 mL/min to give a reaction aqueous solution. Simultaneously, 25% by mass ammonia water and a 25% by mass sodium hydroxide aqueous solution were added to the reaction aqueous solution at a constant speed. Crystallization (nuclei formation) was effected for 15 seconds while controlling the pH value to 13.0 (the pH value for nuclei formation) with the ammonium concentration of the reaction aqueous solution (the aqueous solution for nuclei formation) kept at the above value.

Particle Growth Step

After forming nuclei, only the supply of the 25% by mass sodium hydroxide aqueous solution was temporarily stopped until the pH value of the reaction aqueous solution became 11.6 at a reference solution temperature of 25° C.

After the pH value of the reaction aqueous solution reached 11.6, the supply of the 25% by mass sodium hydroxide aqueous solution to the reaction aqueous solution (the aqueous solution for particle growth) was resumed. With the ammonium concentration kept at the above value and with the pH value controlled to 11.6 at a solution temperature of 25° C., crystallization was continued for 30 min to grow particles. Then, the supply of the solution was temporarily stopped, and a nitrogen gas was circulated at 5 L/min until the oxygen concentration of the space in the reaction vessel became 0.2% by volume or less. Then, the supply of the solution was resumed. Thus, crystallization was effected for a total of 2 hours after the start of growth.

When the reaction vessel was filled with the solution, crystallization and stirring were stopped, and the solution was left to stand. Thus, the precipitation of the product was facilitated. Subsequently, a half of the supernatant was extracted from the reaction vessel and then crystallization was resumed and effected for two hours (particle growth: a total of four hours) and then ended. The product was washed, filtered, and dried to give composite hydroxide particles.

During the crystallization, the pH was controlled by adjusting the supply flow rate of the aqueous solution of sodium hydroxide using a pH controller. The variation width was within a range of ±0.2 of the set value.

The resulting composite hydroxide particles had a pore structure, consisted of spherical secondary particles having an average particle diameter of 9.3 µm which were agglomerations of primary particles having diameters of 1 µm or less, and had a porosity of 51%. For the composition thereof, the molar ratio among nickel, cobalt, and manganese was 50:20:30.

Washing with Carbonate

The composite hydroxide particles were separated into solid and liquid components using a filter press, then washed with 0.28 mol/L of an aqueous solution of sodium carbonate having a temperature of 25° C. and a pH of 11.5 (at a reference temperature of 25° C.) by passing the aqueous solution through the filter press at a rate of 3000 mL with respect to 1000 g of the composite hydroxide particles, and further washed with pure water by passing it through the filter press. Table 1 shows the results, including the composition of the washed nickel-cobalt-manganese composite hydroxide (precursor) and the amount of impurities.

Production of Positive Electrode Active Material Mixing Step

Lithium-nickel composite hydroxide and lithium hydroxide monohydrate (available from Wako Pure Chemical Industries, Ltd.) were weighed, and the resulting composite hydroxide particles and the lithium compound were mixed in such a manner that the molar ratio among the metal elements of lithium-nickel composite oxide became Ni:Co:Mn:Li=0.50:0.20:0.30:1.08.

Firing Step

The resulting mixture was fired using an electric furnace in an air atmosphere at 900° C. for 9 hours. Then, the mixture was cooled to room temperature in the furnace and then cracked to give a positive electrode active material consisting of spherical lithium-nickel-cobalt-manganese composite oxide particles which were agglomerations of primary particles.

Evaluation of Positive Electrode Active Material

This positive electrode active material was embedded in a resin and subjected to cross-section polishing, and a cross-section thereof was observed using a 5000×SEM. As a result, the positive electrode active material was confirmed to have a hollow structure including a shell consisting of sintered primary particles and a hollow inside the shell. The porosity of the positive electrode active material obtained from this observation was 58%. Using this positive electrode active material, a battery was produced in the following manner. The physical property results of the precursor are shown in Table 1, and the physical property results of the active material are shown in Table 2. The composition and impurity amounts of the resulting positive electrode active material are shown in Table 2.

Method for Producing Battery

With 90 parts by weight of the positive electrode active material powder were mixed 5 parts by weight of acetylene black and 5 parts by weight of polyvinylidene fluoride, and n-methylpyrrolidone was added to make the mixture pasty. The pasty positive electrode active material was applied to a 20-µm-thick aluminum foil in such a manner that the weight of the active material became 0.05 g/cm$^2$ when dried, dried in a vacuum at 120° C., and then punched into a 1-cm-diameter disc serving as a positive electrode.

Lithium metal was used as a negative electrode, and an equivalent mixed solution of ethylene carbonate (EC) and diethyl carbonate (DEC) using 1M of LiClO$_4$ as a supporting electrolyte was used as an electrolyte solution. A separator formed of polyethylene was impregnated with the electrolyte solution, and a 2032-type coin battery was produced in a glove box containing an Ar gas atmosphere whose dew point was controlled to −80° C. FIG. 1 shows a schematic structure of the 2032-type coin battery. The coin battery includes a positive electrode (evaluation electrode) 1 in a positive electrode can 5, a lithium metal negative electrode 3 in a negative electrode can 6, a separator 2 impregnated with the electrolyte solution, and a gasket 4. Properties (the discharge capacity, coulomb efficiency, reaction resistance) of the battery are shown in Table 2.

Example 2

A positive electrode active material was prepared as in Example 1 except that composite hydroxide particles were washed with 50 g/L of an aqueous solution of 0.47 mol/L sodium carbonate having a pH of 11.8 (at a reference temperature of 25° C.), and then evaluated. The evaluations are shown in Tables 1 and 2.

Example 3

A positive electrode active material was prepared as in Example 1 except that composite hydroxide particles were washed with 50 g/L of an aqueous solution of 1.12 mol/L sodium carbonate having a pH of 12.0 (at a reference temperature of 25° C.), and then evaluated. The evaluations are shown in Tables 1 and 2.

Example 4

A positive electrode active material was prepared as in Example 1 except that the molar ratio among the metal elements in the mixed aqueous solution was Ni:Co:Mn=60:20:20 in a nuclei formation step for producing a precursor, and then evaluated. The evaluations are shown in Tables 1 and 2.

The composite hydroxide particles prepared had a pore structure, consisted of spherical secondary particles having an average particle diameter of 9.8 µm which were agglomerations of primary particles having a diameter of 1 µm or less, and had a porosity of 46%. For the composition thereof, the molar ratio among nickel, cobalt, and manganese was 60:20:20. The positive electrode active material had a hollow structure or porous structure and a porosity of 49%.

Example 5

A positive electrode active material was prepared as in Example 1 except that the molar ratio among the metal elements in the mixed aqueous solution was Ni:Co:Mn=40:10:50 in a nuclei formation step for producing a precursor and that a nitrogen gas was circulated at 5 L/min throughout the nuclei formation step and a particle growth step so that the oxygen concentration of the space in the reaction vessel became 0.2% by volume or less, and then evaluated. The evaluations are shown in Tables 1 and 2.

The composite hydroxide particles prepared had a pore structure, consisted of spherical secondary particles having an average particle diameter of 10.1 μm which were agglomerations of primary particles having a diameter of 1 μm or less, and had a porosity of 32%. For the composition thereof, the molar ratio among nickel, cobalt, and manganese was 40:10:50. The positive electrode active material had a hollow structure or porous structure and a porosity of 27%.

Comparative Example 1

A positive electrode active material was prepared as in Example 1 except that composite hydroxide particles were washed with an aqueous solution of 0.09 mol/L sodium carbonate having a pH of 11.0 (at a reference temperature of 25° C.), and then evaluated. The evaluations are shown in Tables 1 and 2.

Comparative Example 2

A positive electrode active material was prepared as in Example 1 except that composite hydroxide particles were washed with an aqueous solution of 1.60 mol/L sodium hydroxide having a pH of 13.5 (at a reference temperature of 25° C.), and then evaluated. The evaluations are shown in Tables 1 and 2. Lithium-nickel composite oxide was prepared, and a battery was produced using the lithium-nickel composite oxide. The results are shown in Table 1.

Comparative Example 3

A positive electrode active material was prepared as in Example 1 except that composite hydroxide particles were washed with an aqueous solution of 3.39 mol/L sodium hydroxide having a pH of 14.0 (at a reference temperature of 25° C.), and then evaluated. The evaluations are shown in Tables 1 and 2.

Comparative Example 4

A positive electrode active material (lithium-nickel-cobalt-manganese composite oxide) was prepared as in Example 1 except that: crystallization was effected by using a reaction vessel for continuous crystallization having an overflow pipe in an upper part thereof, continuously adding a mixed aqueous solution similar to that in Example 5, an aqueous ammonia solution, and an aqueous sodium hydroxide solution at a constant flow rate while keeping the 25° C.-based pH at a constant value of 12.5, setting the average residence time in the vessel to 10 hours, and continuously collecting the overflowing slurry; after the inside of the reaction vessel reached equilibrium, the slurry was collected and separated into solid and liquid components; the product was washed with water, filtered, and dried to give nickel composite hydroxide particles; and no washing step was performed after the firing step. Then, the positive electrode active material prepared was evaluated. The evaluations are shown in Tables 1 and 2.

No pore structure was observed in the composite hydroxide particles prepared; the composite hydroxide particles had a dense particle structure, consisted of spherical secondary particles having an average particle diameter of 8.1 μm which were agglomerations of primary particles having a diameter of 1 μm or less, and had a porosity of 3%. For the composition thereof, the molar ratio among nickel, cobalt, and manganese was 0.40:0.10:0.50. The positive electrode active material had a dense particle structure and a porosity of 2%.

TABLE 1

| | composition of composite hydroxide particles | porosity (%) | washing solution | concentration g/L (mol/L) | amount of impurities (mass %) | | |
|---|---|---|---|---|---|---|---|
| | | | | | SO$_4$ | Na | Cl |
| Example1 | Ni$_{0.50}$Co$_{0.20}$Mn$_{0.30}$(OH)$_2$ | 51 | sodium carbonate | 30 (0.28) | 0.29 | 0.028 | 0.013 |
| Example2 | Ni$_{0.50}$Co$_{0.20}$Mn$_{0.30}$(OH)$_2$ | 51 | sodium carbonate | 50 (0.47) | 0.26 | 0.025 | 0.012 |
| Example3 | Ni$_{0.50}$Co$_{0.20}$Mn$_{0.30}$(OH)$_2$ | 51 | sodium carbonate | 120 (1.12) | 0.21 | 0.021 | 0.007 |
| Example4 | Ni$_{0.60}$Co$_{0.20}$Mn$_{0.20}$(OH)$_2$ | 46 | sodium carbonate | 30 (0.28) | 0.29 | 0.025 | 0.01 |
| Example5 | Ni$_{0.40}$Co$_{0.10}$Mn$_{0.50}$(OH)$_2$ | 32 | sodium carbonate | 30 (0.28) | 0.26 | 0.027 | 0.014 |
| Comparative Example1 | Ni$_{0.50}$Co$_{0.20}$Mn$_{0.30}$(OH)$_2$ | 51 | sodium carbonate | 10 (0.09) | 0.46 | 0.034 | 0.025 |
| Comparative Example2 | Ni$_{0.50}$Co$_{0.20}$Mn$_{0.30}$(OH)$_2$ | 51 | sodium hydroxide | 65 (1.6) | 0.58 | 0.036 | 0.26 |
| Comparative Example3 | Ni$_{0.50}$Co$_{0.20}$Mn$_{0.30}$(OH)$_2$ | 51 | sodium hydroxide | 136 (3.39) | 0.49 | 0.041 | 0.25 |
| Comparative Example4 | Ni$_{0.40}$Co$_{0.10}$Mn$_{0.50}$(OH)$_2$ | 3 | sodium carbonate | 30 (0.28) | 0.09 | 0.015 | 0.011 |

TABLE 2

| | firing temperature (°C.) | composition of composite oxide particles | porosity (%) | amount of impurities (mass %) | | | discharge capacity (mAh/g) | coulomb efficiency (%) | reaction resistance (Ω) |
|---|---|---|---|---|---|---|---|---|---|
| | | | | $SO_4$ | Na | Cl | | | |
| Example1 | 900 | $Li_{1.08}Ni_{0.50}Co_{0.20}Mn_{0.30}O_2$ | 58 | 0.27 | 0.030 | 0.003 | 159 | 88.5 | 3.2 |
| Example2 | 900 | $Li_{1.08}Ni_{0.50}Co_{0.20}Mn_{0.30}O_2$ | 57 | 0.24 | 0.026 | 0.003 | 162 | 88.9 | 3.4 |
| Example3 | 900 | $Li_{1.08}Ni_{0.50}Co_{0.20}Mn_{0.30}O_2$ | 58 | 0.18 | 0.023 | 0.003 | 163 | 88.7 | 3.1 |
| Example4 | 860 | $Li_{1.08}Ni_{0.60}Co_{0.20}Mn_{0.20}O_2$ | 49 | 0.27 | 0.027 | 0.003 | 175 | 89.1 | 2.9 |
| Example5 | 930 | $Li_{1.08}Ni_{0.40}Co_{0.10}Mn_{0.50}O_2$ | 27 | 0.25 | 0.029 | 0.004 | 160 | 88.4 | 3.4 |
| Comparative Example1 | 900 | $Li_{1.08}Ni_{0.50}Co_{0.20}Mn_{0.30}O_2$ | 58 | 0.45 | 0.035 | 0.006 | 153 | 87.6 | 3.8 |
| Comparative Example2 | 900 | $Li_{1.08}Ni_{0.50}Co_{0.20}Mn_{0.30}O_2$ | 57 | 0.56 | 0.038 | 0.018 | 157 | 86.9 | 3.6 |
| Comparative Example3 | 900 | $Li_{1.08}Ni_{0.50}Co_{0.20}Mn_{0.30}O_2$ | 58 | 0.48 | 0.043 | 0.006 | 157 | 88.2 | 3.6 |
| Comparative Example4 | 930 | $Li_{1.08}Ni_{0.40}Co_{0.10}Mn_{0.50}O_2$ | 2 | 0.09 | 0.017 | 0.002 | 158 | 87.9 | 3.8 |

Table 1 indicates that the nickel-manganese composite hydroxide particles and lithium-nickel-manganese composite oxide particles of Examples 1 to 5 had structures where many pores were present within the particles (including porous structures/hollow structures) but contained very small amounts of impurities. Also, the positive electrode active materials prepared had excellent battery characteristics, such as high capacity, high coulomb efficiency, and low reaction resistance.

On the other hand, the composite hydroxide particles and composite oxide particles of Comparative Examples 1 to 3 had structures where many pores were present within the particles, as well as contained large amounts of impurities and had low capacity and high reaction resistance because they were not washed sufficiently.

As for the composite hydroxide particles of Comparative Example 4 had a dense particle structure and were sufficiently washed with sodium carbonate and therefore contained a smaller amount of impurities than Examples. However, the positive electrode active material thereof had a less pore structure and therefore contacted an electrolyte solution in a smaller area and exhibited lower battery characteristics than Example 5 having a similar composition ratio.

INDUSTRIAL APPLICABILITY

The precursor of a positive electrode active material for nonaqueous electrolyte secondary batteries and the positive electrode active material for nonaqueous electrolyte secondary batteries according to the present invention contain a significantly reduced amount of impurities, and a nonaqueous electrolyte secondary battery using this positive electrode active material has high capacity and excellent coulomb efficiency and reaction resistance. For this reason, this battery is preferred particularly as a rechargeable secondary battery used in the field of small electronic devices and has extremely high industrial applicability.

DESCRIPTION OF REFERENCE SIGNS 1 positive electrode (evaluation electrode)
2 separator (impregnated with electrolyte solution)
3 lithium metal negative electrode
4 gasket
5 positive electrode can
6 negative electrode can

The invention claimed is:

1. A positive electrode active material for nonaqueous electrolyte secondary batteries, consisting of
   lithium-nickel-manganese composite oxide particles represented by the general formula (2), wherein
   the positive electrode active material has a sulfate group content of 0.4% by mass or less and a sodium content of 0.035% by mass or less,
   the lithium-nickel-manganese composite oxide particles have a hollow consisting of a central space and a shell outside the hollow or pores are distributed throughout the particles, and wherein a porosity of the lithium-nickel-manganese composite oxide particles is from 49 to 58%, $$Li_aNi_xCo_yMn_zM_tO_2 \quad \text{general formula (2)}$$

where $0.95 \le a \le 1.20$; $0.2 \le x \le 0.8$; $0 \le y < 0.3$; $0.07 < z \le 0.8$; $0 \le t \le 0.1$; $x+y+z+t=1$; and M is at least one element selected from Mg, Ca, Ba, Sr, Al, Ti, V, Cr, Zr, Mo, Hf, Ta, and W.

2. The positive electrode active material for nonaqueous electrolyte secondary batteries of claim 1, wherein the positive electrode active material has a chlorine content of 0.05% by mass or less.

3. A nonaqueous electrolyte secondary battery comprising the positive electrode active material for nonaqueous electrolyte secondary batteries of claim 1.

4. The positive electrode active material for nonaqueous electrolyte secondary batteries of claim 1, wherein $0.1 \le y \le 0.25$.

5. The positive electrode active material for nonaqueous electrolyte secondary batteries of claim 1, wherein $0.35 \le x \le 0.6$.

6. The positive electrode active material for nonaqueous electrolyte secondary batteries of claim 1, wherein $0.1 \le z \le 0.5$.

7. The positive electrode active material for nonaqueous electrolyte secondary batteries of claim 1, which has a porous structure.

* * * * *